United States Patent Office.

LUIGI F. LASTRETO, OF SAN FRANCISCO, CALIFORNIA.

Letters Patent No. 101,027, dated March 22, 1870.

IMPROVED MEDICINAL BEVERAGE.

The Schedule referred to in these Letters Patent and making part of the same.

*To all whom it may concern:*

Be it known that I, LUIGI F. LASTRETO, of the city and county of San Francisco, State of California, have invented an Improved Beverage, called Choca; and I do hereby declare the following description is sufficient to enable any person skilled in the art or science to which it most nearly appertains to make and use my said invention and improvement without further invention or experiment.

The nature of my invention is to provide an improved beverage, which shall be a substitute for coffee, chocolate, and beverages of that class, and which, while containing all the properties of either as a stimulant, shall have an additional tonic effect, which renders it valuable for invalids, and renders it possible for those to drink it who cannot drink the others.

My improved beverage, which I call choca, is composed of cocoa and coffee, intimately combined, and having a certain proportion of sarsaparilla and quinia, to give the proper tonic effect.

These proportions may be somewhat varied to suit different tastes, but I have found that the proportions which are the most suitable and palatable are as follows:

In every one hundred parts I use thirty-five and three-fourths per cent. of cocoa; twenty-one and one-half per cent. of coffee; forty-two and three-fourths per cent. of sugar.

To these ingredients are added about four ounces of sarsaparilla and four ounces of quinia.

The cocoa and coffee are first ground separately, after which all the ingredients are mixed and placed in a machine which is warmed by steam.

The mass is then intimately compounded and afterwards pressed into molds and left to cool, when it will be fit for use and may be prepared like chocolate.

Having thus described my invention,

What I desire to secure by Letters Patent is—

A beverage composed of the ingredients herein mentioned, and compounded in the proportions described.

In witness whereof I have hereunto set my hand and seal.

LUIGI F. LASTRETO. [L. S.]

Witnesses:
W. R. BOONE,
JOHN L. BOONE.